(12) United States Patent
Kotipalli

(10) Patent No.: US 8,200,475 B2
(45) Date of Patent: Jun. 12, 2012

(54) PHONETIC-BASED TEXT INPUT METHOD

(75) Inventor: Krishna V Kotipalli, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 10/777,154

(22) Filed: Feb. 13, 2004

(65) Prior Publication Data

US 2005/0182616 A1    Aug. 18, 2005

(51) Int. Cl.
*G06F 17/28*    (2006.01)
*G06F 3/02*    (2006.01)
*H03K 17/94*    (2006.01)

(52) U.S. Cl. ............ 704/3; 704/2; 345/168; 345/172; 341/22; 341/26

(58) Field of Classification Search .......... 345/168, 345/172; 341/22, 26; 709/246; 704/2, 3
See application file for complete search history.

(56) References Cited

U.S. PATENT DOCUMENTS

| | | | | |
|---|---|---|---|---|
| 4,731,735 A * | 3/1988 | Borgendale et al. | ............ | 707/4 |
| 5,047,932 A | 9/1991 | Hsieh | | |
| 5,136,504 A | 8/1992 | Fushimoto | | |
| 5,243,519 A * | 9/1993 | Andrews et al. | ............ | 704/8 |
| 5,432,948 A * | 7/1995 | Davis et al. | ............ | 704/2 |
| 5,490,061 A * | 2/1996 | Tolin et al. | ............ | 704/2 |
| 5,526,529 A * | 6/1996 | Tamano | ............ | 455/103 |
| 5,535,119 A | 7/1996 | Ito et al. | | |
| 5,640,587 A | 6/1997 | Davis | | |
| 5,649,214 A * | 7/1997 | Bruso et al. | ............ | 704/8 |
| 5,677,835 A * | 10/1997 | Carbonell et al. | ............ | 704/8 |
| 5,793,381 A | 8/1998 | Edberg et al. | | |
| 5,870,084 A | 2/1999 | Kanungo et al. | | |
| 5,953,692 A | 9/1999 | Siegel | | |
| 5,966,637 A | 10/1999 | Kanungo et al. | | |
| 6,078,885 A | 6/2000 | Beutnagel | | |
| 6,092,035 A | 7/2000 | Kurachi et al. | | |
| 6,131,102 A | 10/2000 | Potter | | |
| 6,204,782 B1 * | 3/2001 | Gonzalez et al. | ............ | 341/90 |
| 6,275,789 B1 | 8/2001 | Moser et al. | | |
| 6,340,937 B1 * | 1/2002 | Stepita-Klauco | ............ | 341/23 |
| 6,356,866 B1 | 3/2002 | Pratley et al. | | |
| 6,362,752 B1 | 3/2002 | Guo et al. | | |
| 6,363,342 B2 | 3/2002 | Shaw et al. | | |
| 6,377,966 B1 | 4/2002 | Cooper et al. | | |
| 6,388,657 B1 * | 5/2002 | Natoli | ............ | 345/168 |
| 6,411,948 B1 | 6/2002 | Hetherington et al. | | |
| 6,429,793 B1 * | 8/2002 | Paolini | ............ | 341/22 |

(Continued)

OTHER PUBLICATIONS

Virga et al. "Transliteration of Proper Names in Cross-Lingual Information Retrieval", Proceedings of the ACL 2003 workshop on Multilingual and mixed-language named entity recognition—vol. 15, Sapporo, Japan, pp. 57-64 Year of Publication: 2003.*

(Continued)

*Primary Examiner* — Jialong He
(74) *Attorney, Agent, or Firm* — Microsoft Corporation

(57) ABSTRACT

A method for transliterating languages in a computer system is disclosed. The method includes using a phonetic mapping engine to map languages to phonetic strings and vice versa. A user unfamiliar with a keyboard layout for a particular language may type phonetic strings using a known keyboard layout of a language known to the user. The typed input is captured by a keyboard hook, and based on a predefined phonetic mapping scheme, can be converted to the desired language.

20 Claims, 9 Drawing Sheets

U.S. PATENT DOCUMENTS

| | | | |
|---|---|---|---|
| 6,446,133 | B1 | 9/2002 | Tan et al. |
| 6,460,015 | B1 * | 10/2002 | Hetherington et al. ............ 704/8 |
| 6,562,078 | B1 * | 5/2003 | Yang et al. .................... 715/202 |
| 6,848,080 | B1 | 1/2005 | Lee et al. |
| 6,890,180 | B2 | 5/2005 | Sterns et al. |
| 7,099,876 | B1 | 8/2006 | Hetherington et al. |
| 7,107,204 | B1 | 9/2006 | Liu et al. |
| 7,165,019 | B1 | 1/2007 | Lee et al. |
| 7,369,986 | B2 * | 5/2008 | Janakiraman et al. ............ 704/8 |
| 7,398,199 | B2 | 7/2008 | Gong |
| 7,453,439 | B1 | 11/2008 | Kushler et al. |
| 7,484,106 | B2 | 1/2009 | Rhoten et al. |
| 7,502,632 | B2 | 3/2009 | Ciminelli |
| 7,554,529 | B2 | 6/2009 | Kotipalli |
| 7,636,083 | B2 | 12/2009 | Aoki et al. |
| 7,649,478 | B1 * | 1/2010 | Yoon .............................. 341/22 |
| 7,777,725 | B2 * | 8/2010 | Guthrie ......................... 345/168 |
| 2002/0087311 | A1 | 7/2002 | Leung Lee et al. |
| 2002/0116196 | A1 | 8/2002 | Tran |
| 2002/0130844 | A1 * | 9/2002 | Natoli ........................... 345/168 |
| 2003/0074185 | A1 | 4/2003 | Kang |
| 2003/0195741 | A1 * | 10/2003 | Mani et al. ........................ 704/8 |
| 2003/0212545 | A1 | 11/2003 | Kallulli |
| 2004/0024604 | A1 | 2/2004 | Wen et al. |
| 2004/0039996 | A1 | 2/2004 | Flam |
| 2004/0066374 | A1 * | 4/2004 | Holloway et al. ............. 345/168 |
| 2005/0017954 | A1 | 1/2005 | Kay et al. |
| 2005/0027534 | A1 | 2/2005 | Meurs et al. |
| 2005/0043939 | A1 | 2/2005 | Trower et al. |
| 2005/0043941 | A1 | 2/2005 | Janakiraman et al. |
| 2005/0060138 | A1 | 3/2005 | Wang et al. |
| 2005/0114145 | A1 * | 5/2005 | Janakiraman et al. ........ 704/277 |
| 2005/0138209 | A1 * | 6/2005 | Dayar et al. .................. 709/246 |
| 2005/0182616 | A1 | 8/2005 | Kotipalli |
| 2005/0195171 | A1 | 9/2005 | Aoki et al. |
| 2006/0018545 | A1 | 1/2006 | Zhang et al. |
| 2006/0033718 | A1 | 2/2006 | Griffin |

OTHER PUBLICATIONS

Schafer et al. "Inducing Translation Lexicons via diverse similiarty measures and bridge languages", International Conference on Computational Linguistics proceedings of the 6th conference on Natural language learning—vol. 20,pp. 1-7 Year of Publication: 2002.*

PinYin, An article from http://www.wikipedia.com, [online], retrevied from http://www.archive.org, archived on Dec. 2003.*

Zsigri, "Learn ZhuYin", [online], http://zsigri.tripod.com; published on Aug. 7, 2000, retrieved from http://www.archive.org, archived on Oct. 2002.*

Murat Tayli and Abdullah I Al-Salamah ; Communications of the ACM May 1990; "Building Bilingual Microcomputer Systems"; pp. 495-503; vol. 33; No. 5.

Tzvee Zahavy ; Collegiate Microcomputer Feb. 1987; "Homebrew Hebrew: Using the Microcomputer from Right to Left"; pp. 109-112; vol. V; No. 1.

Masauke Morita; Japanese Text Input System May 1985; "NEC Corporation"; pp. 29-35.

Wan et al., "Automatic English-Chinese name transliteration for development of multilingual resources", vol. 2, Association for Computational Linguistics, 1998, pp. 1352-1356.

"Proceedings of the Language Technology Business Meet (LTBM) and Technology Handshakes", Nov. 7-8, 2001, pp. 4-16.

International Search Report, PCT/US2008/052862, Jun. 17, 2008.

"Decuma 4 adds prediction and personalisation to pen input", Rafe Blandford, http://www.aliaboutsymbian.com/news/item/Decuma_4_adds_prediction_and_personalisation_to_pen_input.php., Feb. 9, 2006.

"Isolated-word Error Correction for Partially Phonemic Languages using Phonetic Cues", Bhupesh Bansal, Monojit Choudhury, Pradipta Ranjan Ray, Sudeshna Sarkar and Anupam Basu, http://www.citeseerc.ist.psw.edu/viewdoc/summary?dsi-10.1.1.138.4.pdf, Proc of the Int. conf. on Knowledge based Computer Systems (KBCS) 2004. Hvderabad, India, Dec. 2004.

"How to Input Chinese in English Windows", 2005, http://www.newconcet.com/Reference/how_input_chinese.htm#2.%20Summary.

"A tool for automatic feedack on phonemic transcriptions", Martin Cooke, Maria Luisa Garcia Lecumberri and John Maidment, http://www.dcs.shef.ac.uk/~martin/docs/es.pdf, EuroSpeech, 2001.

Non Final Office Action cited in related U.S. Appl. No. 11/701,140 dated Feb. 2, 2010.

Notice of Allowance cited in related U.S. Appl. No. 11/701,140 dated May 19, 2010.

Non Final Office Action cited in related U.S. Appl. No. 11/439,563 dated Aug. 25, 2009.

Final Office Action cited in related U.S. Appl. No. 11/439,563 dated Feb. 22, 2010.

Non Final Office Action cited in related U.S. Appl. No. 11/439,563 dated Jul. 23, 2010.

Final Office Action cited in related U.S. Appl. No. 11/439,563 dated Jan. 7, 2011.

Non Final Office Action cited in related U.S. Appl. No. 11/439,563 dated Mar. 31, 2011.

International Search Report cited in PCT Application No. PCT/US2008/052862 dated Jun. 17, 2008.

Final Office Action cited in U.S. Appl. No. 11/439,563 dated Oct. 4, 2011.

"Isolated-word Error Correction for Partially Phonemic Languages using Phonetic Cues", Bhupesh Bansal, Monojit Choudhury, Pradipta Ranjan Ray, Sudeshna Sarkar and Anupam Basu, Proc. of the Int. Conf. on Knowledge based Computer Systems (KBCS) 2004, Hvderabad, India, Dec. 2004, reprinted from the Internet at: http://www.citeseerc.ist.psw.edu/viewdoc/summary?dsi-10.1.1.138.4.pdf.

"testHELP Read& Write 8 GOLD: Spectronics—Inclusive Learning Technologies" by Spectronics System Ltd. reprinted from the Internet at: http://www.spectronicsinoz.com/product.asp-?product=22392 dated Jun. 15, 2011.

* cited by examiner

*Standard U.S. English keyboard*

FIG. 3
| 0x29 | 0x02 | 0x03 | 0x04 | 0x05 | 0x06 | 0x07 | 0x08 | 0x09 | 0x0a | 0x0b | 0x0c | 0x0d | Back |
|------|------|------|------|------|------|------|------|------|------|------|------|------|------|
| Tab | 0x10 | 0x11 | 0x12 | 0x13 | 0x14 | 0x15 | 0x16 | 0x17 | 0x18 | 0x19 | 0x1a | 0x1b | 0x2b |
| Caps | 0x1e | 0x1f | 0x20 | 0x21 | 0x22 | 0x23 | 0x24 | 0x25 | 0x26 | 0x27 | 0x28 | | Return |
| Shift | | 0x2c | 0x2d | 0x2e | 0x2f | 0x30 | 0x31 | 0x32 | 0x33 | 0x34 | 0x35 | | Shift |
| Control | Alt | | | | Space | | | | | Alt | | Control | |
Scan codes for U.S. Keyboard hardware (Fig. 3a)
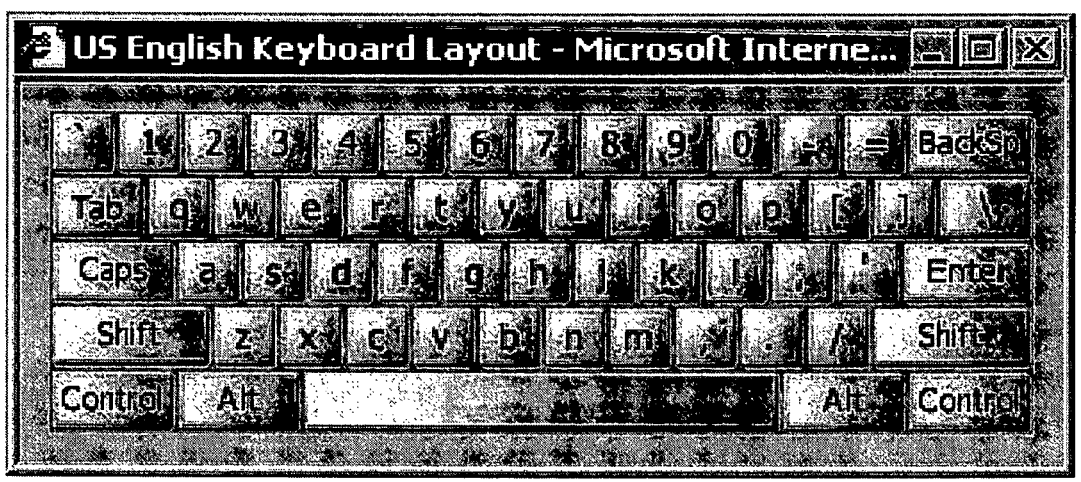
US English Keyboard Layout (Fig. 3b)
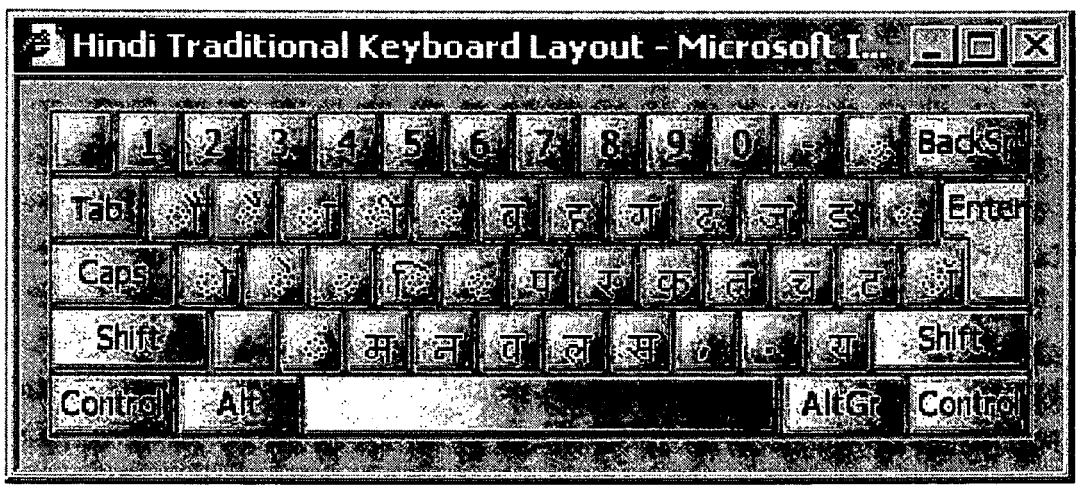
Hindi Traditional Keyboard Layout (Fig. 3c)

FIG. 6
Hindi Phonetic Mapping Scheme

| Vowels | Consonants (ka) | Consonants (tha) |
|---|---|---|
| a अ | k, ka क | tha त |
| aa, A आ | K, Ka ख | THa थ |
| i इ | g, ga ग | dha द |
| ii, I ई | G, Ga घ | DHa ध |
| u उ | n^a ङ | Na ण |
| uu, U ऊ | | |
| r^u ऋ | Consonants (ta) | Consonants (pa) |
| r^U ॠ | t, ta ट | pa प |
| e, ee, E ए | T, Ta ठ | Pa, fa फ |
| ai ऐ | d, da ड | ba ब |
| o, oo, O ओ | D, Da ढ | Ba भ |
| au औ | na न | ma म |
| aM, an. अं | | |
| aH, ah. अः | Consonants (ta) | Special Chars |
| *Kotpal's Phonetic Scheme for Hindi, v1.1* | t, ta त | oom, AUM, OM ॐ |
| Consonants (ya) | T, Ta थ | aa^ आँ |
| ya य | d, da द | aa^. ऑ |
| ra र | D, Da ध | |
| la ल | na न | |
| La ळ | | |
| va व | | |
| Sa श | | |
| sha ष | | |
| sa स | | |
| ha ह | | |
| ksha क्ष | | |
| gna ज्ञ | | |

600 — 602 — 604

FIG. 7
Telugu Phonetic Mapping Scheme

700 — 702  704

| Vowels | Consonents (cha) | Consonents (tha) |
|---|---|---|
| a ఆ | ca, cha చ | tha త |
| aa, A ఆ | cha, CHA ఛ | THa థ |
| i ఇ | ja జ | dha ద |
| ii, I ఈ | Ja ఝ | DHa ధ |
| u ఉ | N^a ఞ | Na న |
| uu, U ఊ | | |
| r^u ఋ | | |
| r^U ౠ | | |
| e ఎ | | |
| ee, E ఏ | | |
| ai ఐ | | |
| o ఒ | | Consonents (pa) |
| oo, O ఓ | | pa ప |
| au ఔ | Consonents (ka) | Pa ఫ |
| aM అం | ka క | ba బ |
| aH అః | Ka ఖ | Ba భ |
| *Katpata Phonetic Scheme for Telugu v1.1* | ga గ | ma మ |
| | Ga ఘ | |
| Consonents (ta) | n^a ఙ | Consonents (ya) |
| ta ట | | ya య |
| Ta ఠ | | ra ర |
| da డ | | la ల |
| Da ఢ | | La ళ |
| na ణ | | va వ |
| | | sa స |
| | | Sa శ |
| | | sha ష |
| | | ha హ |
| | | ksha క్ష |
| | | jn^a జ్ఞ |

PHONETIC-BASED TEXT INPUT METHOD

BACKGROUND OF THE INVENTION

1. Field of the Invention

The present invention relates to the transliteration of user input into a computing device. More specifically, the invention provides methods for inputting language into a computing device based on a phonetic-based scheme.

2. Description of Related Art

One of the early challenges that faced operating systems developers was how to make operating systems work with many different languages and scripts to allow persons from various different cultures to use the system effectively in their native language.

Early operating systems were typically exclusively text-based and were only able to display characters from the Latin alphabet, i.e., the standard "a b c d . . . " alphabet used to write the English and other Western European languages. These early systems were unable to display the complex characters and symbols from scripts and alphabets used to write languages such as Chinese, Japanese, Russian, Arabic, Korean, Hindi, Sanskrit, and various other languages that utilize non-Latin alphabets. In fact, many of the early text-based operating systems were unable to fully display those Western European languages that utilize special letters and accents (for example, the German umlaut character "ä").

As GUI-based operating systems such as Microsoft® Windows became preferred over text-based system such as DOS, many realized that graphics-based operating systems made it possible to adapt to other more complex characters from non-Latin scripts and alphabets. However, even with the improved ability to display non-Latin alphabets, a problem surfaced. Developers from different countries failed to use standardized tools to create systems that provided multi-language support. Various national and regional standards had been developed for displaying characters. These standards included ASCII for American English, JIS for Japanese, GB Code for Chinese (PRC), Big-5 for Chinese (Taiwan), KS-Code for Korean, and ISCII for Indic languages (i.e. languages of India). Unfortunately, these standards were not compatible with one another and as a result, providing multiple language support in these new GUI-based operating systems was nearly impossible.

In order to rectify this problem, a coalition of engineers from large software companies convened in the late 1980's and proposed a standard known as Unicode. Unicode is a 16-bit code that allows for 2 to the 16th power (65,536) different characters to be defined within the code. Unicode allowed characters/symbols in each language to be assigned a unique value such that when the computer system reads that value, it knows exactly which character/symbol to display on the screen.

Soon thereafter, Unicode became the accepted standard for rendering characters and symbols in computer operating systems, and it became possible for a user to type and display characters from many different languages within the same computer system. Once it was possible to display characters from the various world languages, development efforts began to focus on how best to provide users with an interface for entering characters and symbols from the various languages into the system.

One solution was the development of keyboard layouts. A keyboard layout is the collection of data for each keystroke and shift state combination within a keyboard software driver. A keyboard layout is distinguishable from the physical keyboard. The physical keyboard is comprised of the actual keys that a user strikes with his fingers to provide input to the computer. Most keyboards are physically the same, as shown in FIG. 2. Each key on the physical keyboard has a value assigned to it called a scan code. A key's scan code is sent to the computer each time that key is struck by the user. The shift state (i.e. whether the shift key is being held down) of the physical keyboard is sent as well. This code and the shift state must be interpreted by the software to determine what to display on the screen in response to typing that key. FIG. 3a shows a scan code mapping for a typical U.S. keyboard.

The keyboard layout is the software that is used to receive the hardware call (i.e. the scan code from the physical keyboard) and output text based on the scan code and shift state to the active application. Many languages have keyboard layouts that are unique to that language. Each keyboard layout is configured to call a specific Unicode value for each scan code/shift state combination. For example, striking the key with the scan code 0×10 in an unshifted state will cause the US English keyboard layout to display the 'q' character as can be seen in FIG. 3b. Striking that same key when using a keyboard layout configured for the Hindi language will result in the क character being displayed by the system.

In the Microsoft® Windows operating system environment, users may switch between input languages by using the language toolbar. Referring to FIG. 4, a language bar 400 is shown. The language bar 400 includes a language selection dropdown menu 402 which allows the user to switch between the various installed input languages—for example, English (United States) 404, French (France) 406, or Hindi 408. It may also include other columns that provide the user with other options to configure the input of different languages into the system.

Utilizing different keyboard layouts to input the different Unicode characters that represent various languages is useful when user knows the particular keyboard layout. However, in some cases, users are only familiar with keyboard layouts in a single language and do not know keyboard layouts for additional languages. Thus, there is a need for an input method allowing input of multiple languages while not requiring a user to learn a new keyboard layout.

BRIEF SUMMARY OF THE INVENTION

A method is provided for inputting Unicode characters without having to know a keyboard layout that corresponds to the language that is being typed into the system. The method involves using inputted phonetic strings to output Unicode strings that can be displayed by the operating system as equivalent representations of the inputted phonetic strings.

In one aspect of the invention, a computer implemented method is provided in which phonetic input to an application is received by the computer. Prior to reaching the application, the input is hooked (i.e. captured) by the computer system. The system then converts the hooked phonetic input into a language. The converted input is then passed to the application for display on the computer.

In another aspect of the invention, a method is provided for transliterating a first language to a second language. The method involves displaying a text string in a first language. The text string is submitted to a phonetic mapping engine that has a phonetic mapping scheme for the first language, where it is converted into a phonetic text string. The phonetic mapping engine then, based on a phonetic mapping scheme for a second language, converts the phonetic string into the second language, and displays the converted string on the computing device.

BRIEF DESCRIPTION OF THE DRAWINGS

The present invention is illustrated by way of example and not limited in the accompanying figures in which like reference numerals indicate similar elements and in which:

FIG. 3 shows a scan code mapping for the US English physical keyboard and keyboard layouts for the English and Hindi languages.

FIG. 6 shows an example of a Hindi phonetic mapping scheme.

FIG. 7 shows an example of a Telugu phonetic mapping scheme.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
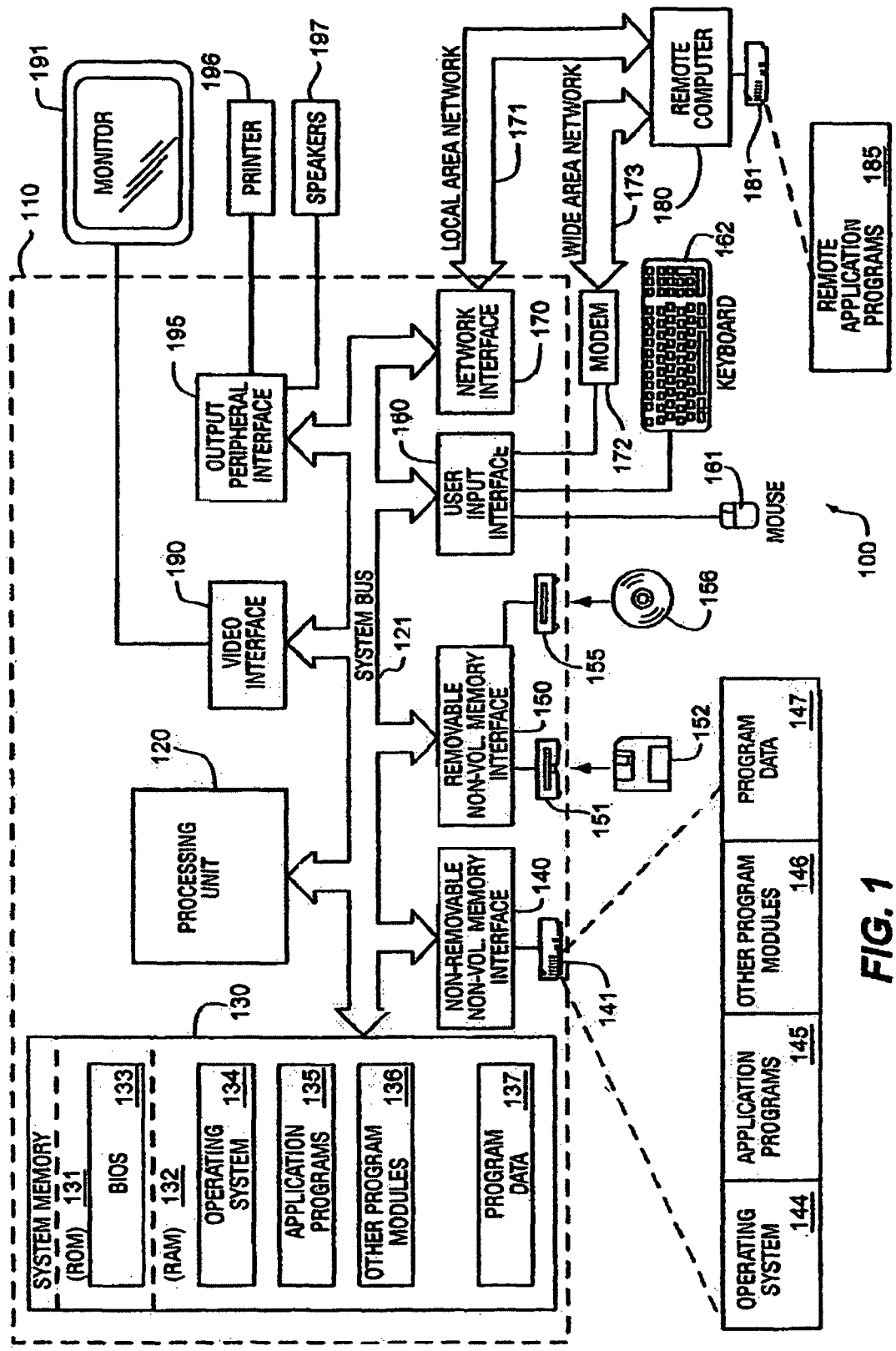
FIG. 1 shows a general purpose computer that provides a suitable environment to practice the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention overcomes limitations and deficiencies found in the prior art by using a phonetic mapping engine to provide transliteration of text inputted into a computer system. Transliteration refers to the expression of words or letters of a language using characters of a non-native alphabet to that language. The phonetic mapping engine receives an input string in a first alphabet, and based on mapping schemes known to the phonetic mapping engine, maps the input string to a Unicode character output string in a second alphabet.

Figure 5:
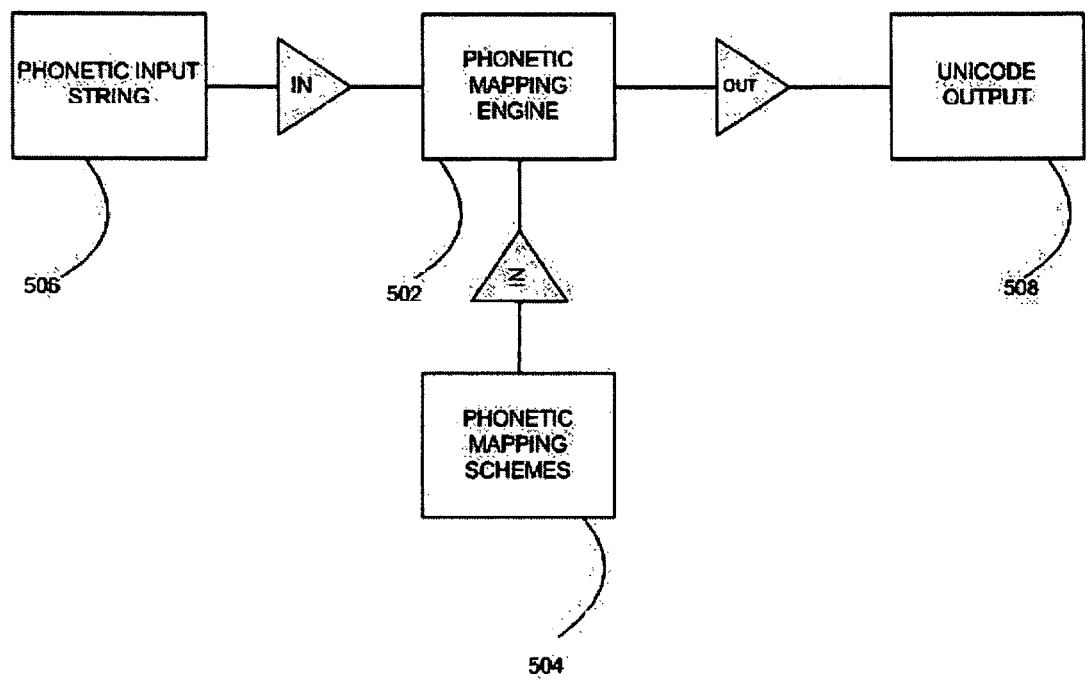
FIG. 5 shows a block diagram of the basic logical structure and data flow of the phonetic mapping engine that may be used to implement aspects of the present invention.

Referring to FIG. 5, a block diagram shows the logical structure of a phonetic mapping engine 502 along with the data flow in and out of the engine. The phonetic mapping engine may be implemented in software stored in system memory 130, in hard disk 141, or on some other storage media known in the art. It may be part of operating system 134,144 or it may be a separate application program 135,145. The phonetic mapping engine 502 uses phonetic mapping schemes 504 that provide mappings of phonetic strings to Unicode characters. Phonetic mapping schemes 504 may provide mappings of phonetic strings received in one alphabet to the alphabet of a given or desired language. The phonetic mapping engine 502 receives an input string 506 which, in an illustrative embodiment, may be a phonetic string in the form of text input as English characters. The phonetic mapping engine 502 receives the input string 506, and converts it to a Unicode character string based on a phonetic mapping scheme 504 that has been provided to the phonetic mapping engine 502. Once the conversion has been completed, the phonetic mapping engine 502 produces Unicode output 508 which is an equivalent representation (in a Unicode supported language) for the phonetic string given.

To illustrate a phonetic mapping scheme 504, examples of two phonetic mappings schemes are provided in FIG. 6 and FIG. 7. FIG. 6 provides an illustrative phonetic mapping scheme 600 for the Hindi language and alphabet. The Hindi language is a language widely spoken and written in India. This Hindi mapping scheme 600 maps phonetic strings 602 typed in the English US alphabet to corresponding Unicode strings 604 that represent the Hindi equivalent of the phonetic string. It may be appreciated by one of skill in the art that the phonetic strings 602 from which the Hindi equivalents are mapped need not necessarily be limited to the English US alphabet. FIG. 7 provides an illustrative phonetic mapping scheme for the Telugu language 700 (also primarily spoken in India). The phonetic strings 702 on the left side in the phonetic mapping scheme 700 for the Telugu language are also typed in the English US alphabet and mapped to corresponding Unicode strings 704 that represent Telugu equivalents. Those of skill in the art will appreciate that a mapping scheme to map from any first alphabet to any language that does not natively use that alphabet may be used.

In an embodiment of the present invention, a method is provided for inputting a language into a computing device using a phonetic mapping engine as described above. This embodiment of the present invention may be used when a user wishes to type in a certain language, but is unfamiliar with the keyboard layout that is typically associated with that language. For example, an English speaking user may wish to type a letter in Hindi, but does not know the Hindi keyboard. The user, however, is familiar with the US English keyboard. The user, presumably familiar with the phonetic mapping scheme for the Hindi language 600 (shown in detail in FIG.

6), e.g., a bi-lingual English/Hindi speaker, may, using the US English keyboard layout, type phonetic strings (according to the Hindi phonetic mapping scheme 600) representing the Hindi words that he or she wishes to appear on the display.

Figure 8A:
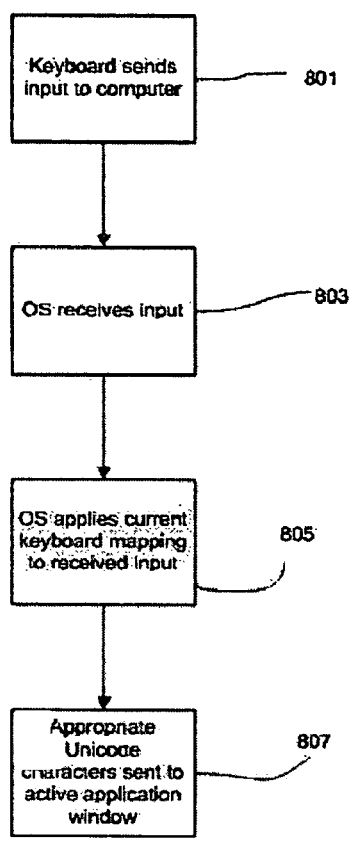
FIG. 8 shows steps used for transliterating characters according to an aspect of the present invention.

Referring now to FIG. 8a (and in view of FIG. 1), a flowchart is presented. The flowchart describes the normal data flow when keyboard input is sent to a computer. In step 801, a key on keyboard 162 is depressed and the keyboard 162 sends input to the computer 110 in the form of a scan code. The scan code is received by computer operating system 134,144 in step 803. In step 805, the operating system 134, 144 determines the current keyboard layout and selects the appropriate output based on the keyboard layout. In step 807, the operating system 134,144 sends the Unicode character provided by the combination of the scan code from the keyboard 162 and the keyboard layout that is active in the system to the active application window where it is displayed to the user on an output device such as monitor 191.

Figure 8B:
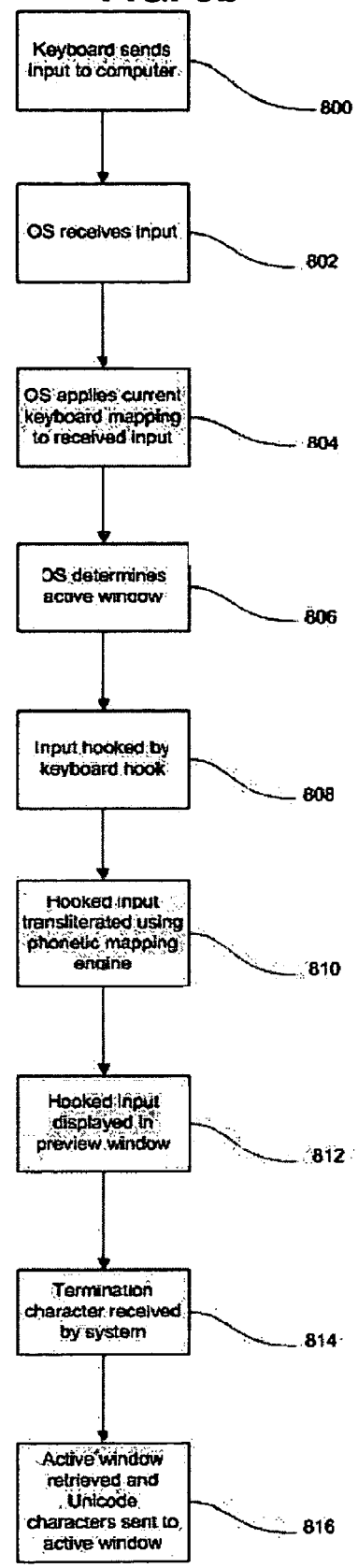

FIG. 8b provides a flowchart that shows the data flow that takes place in an embodiment of the present invention. By way of example and not limitation, the input locale of the current active window is set to the Hindi language. However, rather than configuring the keyboard layout to the traditional Hindi keyboard layout, the keyboard layout is configured to use the US English keyboard layout that is widely used in the United States. In step 800, a key on the keyboard 162 (or possibly some other input device known in the art such as a touchpad or stylus on a personal digital assistant) is struck resulting in a scan code being sent to computer 110. In step 802, the scan code is received by the computer operating system 134,144. In step 804, the operating system 134,144 of computer 110 determines the current keyboard mapping and applies the mapping.

Figure 9A:
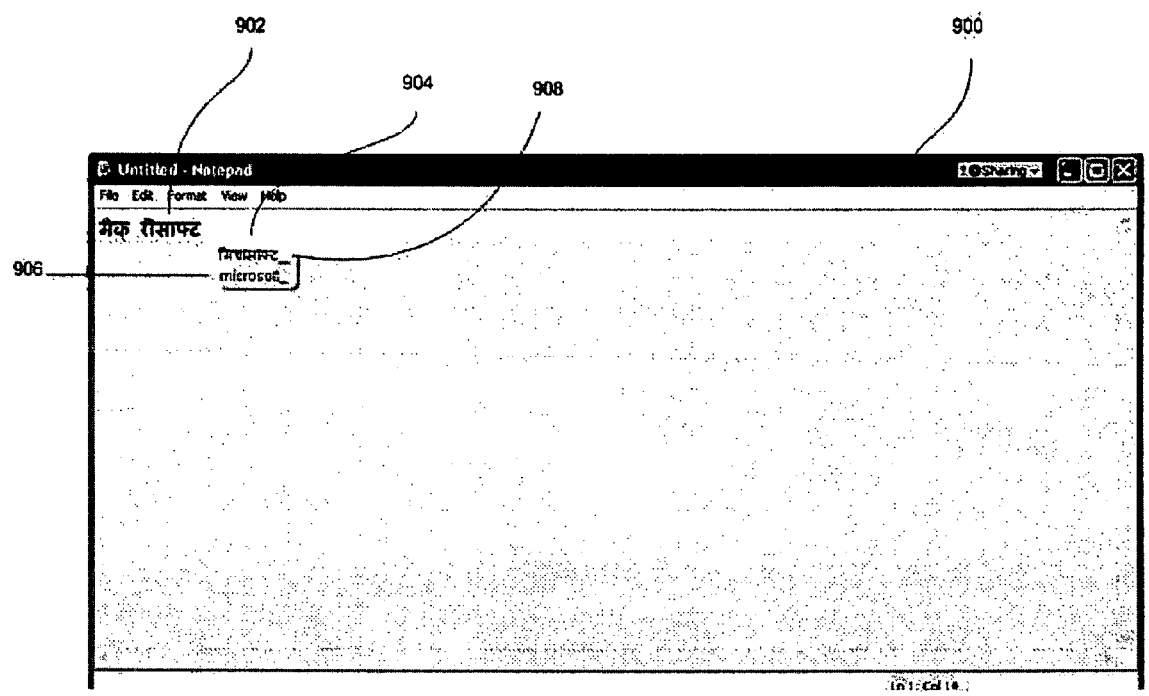
FIG. 9 shows an embodiment of a preview mechanism and a Language Bar that may be used to invoke aspects of the present invention.

In step 806, the operating system 134,144 determines the active window. Because of the keyboard hook, it may be necessary to make this determination programmatically without relying on the base operating system. One way this may be done is through the use of active accessibility APIs that are well-known in the art. In step 808, the received input is captured by a keyboard hook. A hook is a software component that "hooks" data out of its normal traversal path. In one embodiment, this keyboard hook may be implemented as a Windows public API that is installed to capture all keyboard input prior to being sent to the active window's (i.e. active application's) input queue. In step 810, the hooked input is transliterated to another alphabet using phonetic mapping engine 502, described above. In step 812, the hooked input is displayed in a preview window to the user in two parts—the English representation of the phonetic string that was typed by the user, and the Hindi result that will be sent to the active application window and displayed to the user. Displaying the inputted data in this way allows the user to see what Hindi string will be displayed in the active application prior to inserting the string into the application. Referring briefly to FIG. 9a, an illustrative embodiment of this preview mechanism is shown. An active application window 900 is shown with preexisting text 902. In this example, the user has typed the word 'microsoft' using the US English keyboard layout. The user is provided with a preview of how the word will appear in Hindi by preview popup 904. Within preview popup 904, the English text string 906 of what was typed is displayed, with the corresponding Hindi script 908 displayed immediately above.

Referring back to FIG. 8b, in step 814, a termination character is received by the system, indicating the end of a discrete input string, e.g., the end of a word. This termination character may be a space, a carriage return, or a tab (or some other termination character defined in the system). Once the termination character is received, the system displays the Hindi characters in the active window. As a result, in step 816, the system retrieves the active window (which has been monitored by the active accessibility API), and sends the Unicode characters of the mapped string (Hindi script 908 in the present example) to the active window to be displayed on an output device such as monitor 191.

Figure 2:
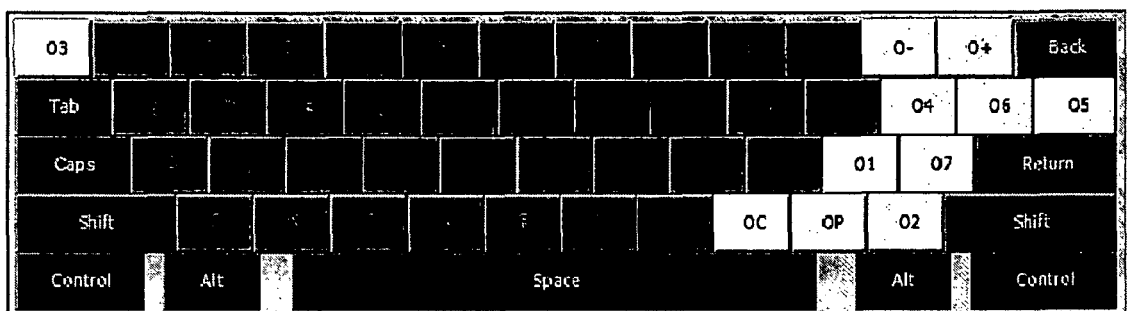
FIG. 2 shows a standard US English physical keyboard as is known in the art.
Figure 9B:
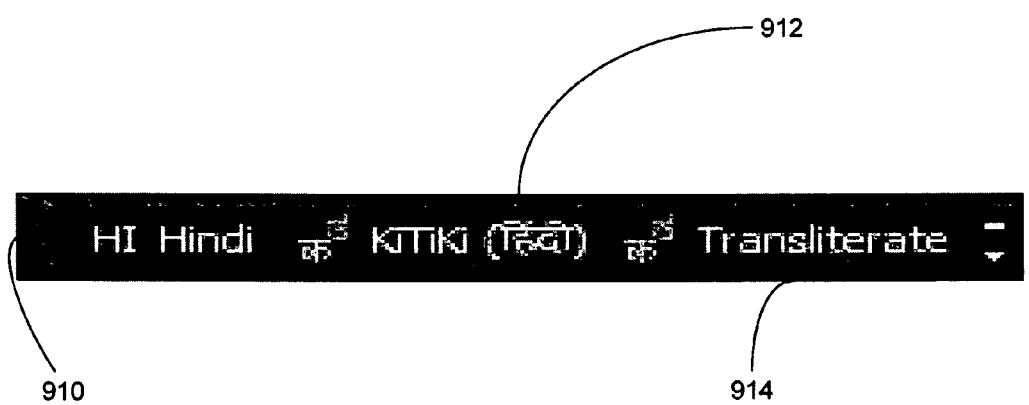

In another embodiment of the present invention, the Text Services Framework (TSF) of the Microsoft® Windows operating system may be used to provide additional options for allowing a user to input and transliterate between languages using phonetic mapping engine 502. Interface elements can added to the language bar 200 that is shown in FIG. 2 utilizing TSF. (Interface elements may be added to other toolbars as well.) FIG. 9b provides an example of a language toolbar that has been modified according to aspects of the present invention.

Figure 4:
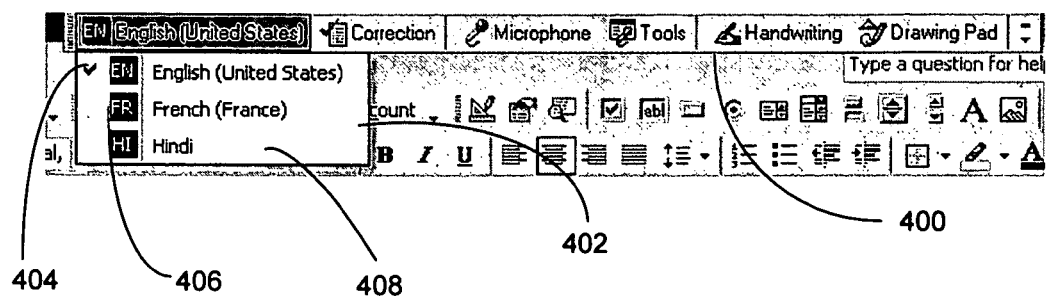
FIG. 4 shows an example of a language bar that is known in the prior art.

Modified language bar 910 has language selection columns 912 which are similar to language selection dropdown 402 found in FIG. 4. In an embodiment of the invention, an additional column is added to the modified language bar 910 that is used to manage the transliteration that is accomplished by phonetic mapping engine 502. This additional column may be referred to as the transliteration menu 914. The transliteration menu allows a user to transliterate text between any two languages that have phonetic mapping schemes 504 associated with them in the phonetic mapping engine 502. This functionality is possible because the phonetic spelling may be used to bridge the different languages and alphabets together.

Figure 10:
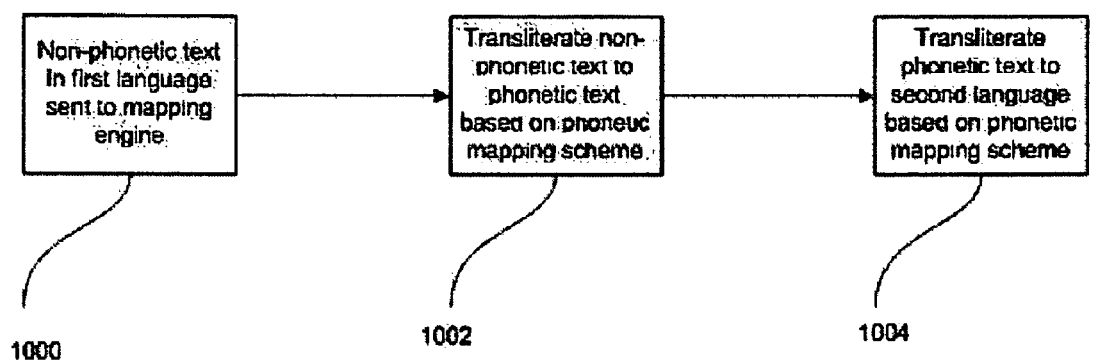
FIG. 10 shows the logical flow that may be used to transliterate text from one language to another according to an aspect of the present invention.

Referring briefly to FIG. 10, the flow of converting from a first language to a second language using an intermediary is shown where there is no direct mapping scheme available from the first language to the second language. In this example, transliteration from Hindi text to Telugu text is shown. In step 1000, the Hindi text is sent phonetic mapping engine 502. In step 1002, phonetic mapping engine 502 uses the Hindi phonetic mapping scheme (shown in FIG. 6) to map the Hindi characters into a phonetic English language string. Finally, in step 1004, phonetic mapping engine 502 takes the phonetic English language string and converts it to Telugu based on the Telugu phonetic mapping scheme (shown in FIG. 7). Thus, by using the English language phonetic mapping as an intermediary that the two languages share in common, the user is able to transliterate Hindi into Telugu.

Referring back to FIG. 9b, the transliteration menu 914 may have a menu item "Transliterate Selection to" which includes a submenu that contains a submenu entry for each language installed on the system. For example, if English (United States), Kitki, and Hindi are installed on the system, the transliteration submenu may include English, Kitki and Hindi. Transliteration menu 914 may have an additional menu item "Transliterate All" which includes a similar transliteration submenu as is found in the "Transliterate Selection to" menu item. The "Transliterate All" menu item provides the ability to transliterate all text in the active window from one language to another via the process described above and shown in FIG. 10.

Thus, using the above described processes and software applications, a user can input text into a computer using phonetic spellings in a first language's alphabet, and the computer phonetically maps the input to a second language that uses an alphabet different than the alphabet of the first language. The application running in the background hooks, or captures, all keyboard input and transliterates the input prior to sending the input to the active application, e.g., a word processor, spreadsheet, or any other application into which the user can type. That is, the transliteration is transparent to the active application, and the active application needs no knowledge of the transliteration process. Thus, the invention provides universal transliteration input capability to a user without requiring other software application programs to be modified in any way.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A computer implemented method for transliterating languages in a computing device comprising:
   receiving a text string in a first alphabet on a keyboard, the text string inputted as a first keystroke typing sequence according to a first keyboard layout of the first alphabet, but the keyboard actually is of a second keyboard layout of a second alphabet, the second keyboard layout different from the first keyboard layout such that the text string is not inputted as a second keystroke typing sequence according to the second keyboard layout, the first keystroke typing sequence different from the second keystroke typing sequence; and
   converting the text string in the first alphabet to a second text string in the second alphabet via a phonetic mapping scheme between the first alphabet and the second alphabet, such that the second text string corresponds to the second keystroke typing sequence, the phonetic mapping scheme configured to map respective characters of the second alphabet to one or more characters of the first alphabet.

2. The method of claim 1, the first alphabet different from the second alphabet.

3. The method of claim 1, the first alphabet comprising a first set of characters, the second alphabet comprising a second set of characters, the first set comprising at least one character not comprised in the second set, and the second set comprising at least one character not comprised in the first set.

4. The method of claim 1, the first alphabet comprising a first set of characters, the second alphabet comprising a second set of characters, a majority of characters comprised in the first set of characters not comprised in the second set, and a majority of characters comprised in the second set of characters not comprised in the first set.

5. The method of claim 1, the phonetic mapping scheme configured to map a first character of the second alphabet to two or more characters of the first alphabet.

6. The method of claim 5, the two or more characters of the first alphabet comprising a consonant and a vowel, the first character of the second alphabet comprising a consonant.

7. The method of claim 1, the text string typed by a user.

8. The method of claim 1, a scan code corresponding to at least one character of the text string in the first alphabet not equal to a scan code of a character in the second alphabet phonetically mapped to the at least one character of the text string in the first alphabet.

9. The method of claim 1, the first alphabet a Latin alphabet and the second alphabet an Indic alphabet.

10. A computer readable memory device comprising computer readable instructions for performing a method for transliterating languages, which when executed via a microprocessor perform actions comprising:
   receiving a text string in a first alphabet on a keyboard the text string inputted as a first keystroke typing sequence according to a first keyboard layout of the first alphabet, but the keyboard actually is of a second keyboard layout of a second alphabet, the second keyboard layout different from the first keyboard layout such that the text string is not inputted as a second keystroke typing sequence according to the second keyboard layout, the first keystroke typing sequence different from the second keystroke typing sequence; and
   converting the text string in the first alphabet to a second text string in the second alphabet via a phonetic mapping scheme between the first alphabet and the second alphabet, such that the second text string corresponds to the second keystroke typing sequence, the phonetic mapping scheme configured to map respective characters of the second alphabet to one or more characters of the first alphabet.

11. The computer readable memory device of claim 10, a scan code corresponding to at least one character of the text string in the first alphabet not equal to a scan code of a character in the second alphabet phonetically mapped to the at least one character of the text string in the first alphabet.

12. The computer readable memory device of claim 10, the first alphabet different from the second alphabet.

13. The computer readable memory device of claim 12, the text string in the first alphabet comprising at least one character that is not present in the second text string in the second alphabet.

14. The computer readable memory device of claim 10, the keyboard labeled with characters of the second alphabet.

15. The computer readable memory device of claim 10, the actions comprising:
   if a determination is made that the phonetic mapping scheme between the first alphabet and the second alphabet is not available, converting the text string in the first alphabet to a third text string in a third alphabet via a second phonetic mapping scheme between the first alphabet and the third alphabet, and converting the third text string in the third alphabet to a fourth text string in the second alphabet via a third phonetic mapping scheme between the third alphabet and the second alphabet.

16. The computer readable memory device of claim 15, the first alphabet a Latin alphabet, the second alphabet a non-Latin alphabet, and the third alphabet a non-Latin alphabet, a majority of characters of the first alphabet not comprised in the second alphabet.

17. A system for transliterating languages comprising:
   a processing unit; and
   memory operatively coupled to the processing unit and comprising instructions that when executed by the processing unit perform a method comprising:
      receiving a text string in a first alphabet on a keyboard, the text string inputted as a first keystroke typing sequence according to a first keyboard layout of the first alphabet, but the keyboard actually is of a second keyboard layout of a second alphabet, the second keyboard layout different from the first keyboard layout such that the text string is not inputted as a second keystroke typing sequence according to the second keyboard layout, the first keystroke typing sequence different from the second keystroke typing sequence; and
      converting the text string in the first alphabet to a second text string in the second alphabet via a phonetic mapping scheme between the first alphabet and the second alphabet,-such that the second text string corresponds to the second keystroke typing sequence, the phonetic mapping scheme configured to map respective characters of the second alphabet to one or more characters of the first alphabet.

18. The system of claim 17, comprising:

if a determination is made that the phonetic mapping scheme between the first alphabet and the second alphabet is not available, converting the text string in the first alphabet to a third text string in a third alphabet via a second phonetic mapping scheme between the first alphabet and the third alphabet, and converting the third text string in the third alphabet to a fourth text string in the second alphabet via a third phonetic mapping scheme between the third alphabet and the second alphabet.

19. The system of claim 17, comprising providing a hooked input for display to a user, the hooked input comprising the text string in the first alphabet and the second text string in the second alphabet.

20. The system of claim 17, comprising sending the second text string in the second alphabet to an active application in response to receiving a termination character.

* * * * *